Patented Mar. 6, 1923.

1,447,203

UNITED STATES PATENT OFFICE.

CARLETON ELLIS AND VERNON T. STEWART, OF MONTCLAIR, NEW JERSEY.

PROCESS OF MAKING ARSENICALS.

No Drawing.   Application filed September 13, 1920.   Serial No. 409,974.

*To all whom it may concern:*

Be it known that we, CARLETON ELLIS and VERNON T. STEWART, citizens of the United States, and residents of Montclair, in the county of Essex and State of New Jersey, have invented certain new and useful Improvements in Processes of Making Arsenicals, of which the following is a specification.

This invention relates to the manufacture of arsenical compounds and particularly to those arsenicals employed as insecticides in agricultural operations and relates especially to the manufacture of arsenic acid by the oxidation of white arsenic or ores containing white arsenic (that is arsenic trioxide) with chlorine or through the agency of chlorine so as to yield arsenic acid in a form suited for use in the preparation of arsenical compounds such as lead or calcium arsenates the production of the latter especially forming a feature of the present invention.

In the manufacture of arsenic acid it is usually the custom to heat arsenic trioxide or white arsenic in nitric acid and evaporate to drive off the excess of nitric acid and oxide of nitrogen fumes, sodium arsenite is also oxidized by means of nitric acid.

In the present invention chlorine gas or chlorine in any suitable form but preferably as obtained from electrolyzers used in making caustic soda is conducted into a solution of arsenic trioxide or white arsenic. Preferably this solution of the white arsenic is in acidulated water and preferably also the solution is heated so as to dissolve the maximum amount of the white arsenic. The chlorine which is employed may contain air and moisture and in fact the presence of a small amount of air in the chlorine gas is not detrimental but even may be beneficial in some cases.

The introduction of the chlorine into the aqueous acid suspension brings about the formation of arsenic acid with the simultaneous formation of hydrochloric acid so that the solution grows progressively stronger in hydrochloric acid unless means are taken to prevent this. With highly concentrated hydrochloric acid, arsenic chloride, oxychloride and the like may form to a small extent at least and affect the purity of the product. On the other hand it is desirable to chlorinate in slightly acid solution as the latter appears to favor the reaction and preferably a strength of from 3 to 10 per cent of hydrochloric acid is employed. Of course other acids could be used for the purpose of acidulation but as hydrochloric acid is produced in the operation it is usefully employed in this manner and in fact advantageously as white arsenic dissolves very readily in comparatively dilute hydrochloric acid solutions so that once in solution the chlorine effects its oxidation more readily than when in suspension. Arsenic acid is very soluble in such a solution and may be separated from any impurities which may be present in the white arsenic which are not affected by the chlorine.

If the strength of the acid becomes so high as to interfere with the reaction through formation of oxychlorides, etc., the acidity may be reduced by neutralization with sodium carbonate, milk of lime or any suitable neutralizing agent.

Chlorination also may take place in neutral or even in alkaline solution but this procedure is not recommended especially when sodium carbonate or caustic soda is used as the alkali owing to the cost of the latter which is used up by conversion into sodium chloride.

The preferred procedure therefore involves the oxidation by means of chlorine in an acid aqueous medium.

As stated it is useful and in fact important to have the white arsenic go into solution readily so that it may be more quickly oxidized than when in a state of suspension and for that reason other solvents or salts which have a solvent action on white arsenic may be introduced. In some cases for example calcium chloride is beneficial. The present invention does not preclude the use of white arsenic in the form of a suspension but in the preferred embodiment the conditions are such that an effective solvent for the white arsenic is maintained at all times during the course of the oxidation. It is also sometimes helpful to add catalyzers such as cobalt nitrate or copper oxide to the aqueous acid medium in order to facilitate the oxidation.

The presence in an insecticide, used for vegetation, of more than about three-fourths of a per cent of soluble arsenic calculated as $As_2O_5$ is undesirable as such an insecticide is prone to burn foliage. It is desirable therefore that the white arsenic shall be completely oxidized to arsenic acid. At the boiling point (at which temperature white arsenic dissolves to best advantage in the acid medium) the reaction apparently cannot always be depended upon to go to completion but in some cases at least forms an equilibrium with a small amount of arsenic trioxide or arsenious acid present. If however the solution is cooled to a temperature say 35-40° C. the residual portion of the lower oxide may be completely oxidized so that arsenic acid of the requisite quality is obtained. The acid solution may then be boiled if desired to eliminate chlorine and some hydrochloric acid and if a residue is present this is filtered off. When white arsenic ores are used considerable residue may be present.

The solution of arsenic acid thus obtained may then be evaporated to dryness if desired but preferably without evaporation and while still in solution it is treated with a precipitating agent such as a lead compound or milk of lime which precipitate the lead or calcium arsenates respectively.

In carrying out the above method of oxidation it is possible to start with the solution hot to dissolve the white arsenic and as the reaction progresses to gradually cool until finally complete oxidation is obtained. In finishing the oxidation other oxidizing agents than chlorine may be employed as for example nitric acid, bromine or potassium permanganate but preferably the last stages of oxidation are completed by means of chlorine. If desired any residues which are obtained may be re-treated with chlorine, or fresh arsenic raw material may be added to the residues in order to submit the latter to more than one treatment to extract all arsenical material possible. In place of white arsenic, the metal itself may be used in some cases, or ores, or smelter products containing white arsenic and metallic arsenic may be utilized.

Besides forming a product which contains a minimum amount of water-soluble arsenical compounds it is also desired that the insecticide be light and fluffy. The addition of milk of lime in the cold gives a bulkier or more fluffy product and also appears to prevent the formation of certain water soluble compounds. Preferably such a proportion of milk of lime is added as will form the tricalcium arsenate. In the first instance the precipitate may have a curdled appearance but on boiling this disappears and a fluffy precipitate settles. This may be filter pressed and then dried at about 110-115° C. If the product is heated too high as for example in some cases above 150° C. there is danger in forming the pyroarsenate the presence of which is not usually desirable. The product should contain arsenic to the amount of 40 per cent calculated as pentoxide in order to conform to certain regulations and in order to make a product of this purity it is desirable not to use an excess of lime nor to have any impurities in the arsenic acid or the lime which would get into the precipitate of calcium arsenate and reduce the content of arsenic. It is however desirable to have a very slight excess of milk of lime in order to make certain of the formation of the tricalcium compound rather than hydrogen calcium arsenate which is more soluble.

In like manner the solution of arsenic acid may be treated with lead oxide, lead hydroxid and the like or a mixture of such lead compounds with calcium hydroxid to form the lead or the mixed lead and calcium arsenates respectively.

In carrying out the process of oxidation of white arsenic by means of chlorine it is not necessary that the arsenic be entirely in solution while the chlorine is being introduced. A magma or suspension of white arsenic or arsenical ore may be used in order to work with more compact apparatus. This magma may be agitated if desired by means of a suitable stirring device. As arsenic acid forms more white arsenic goes into solution so that the latter is constantly replenished with material on which chlorine may act.

A further feature of the invention is a step involving the removal of iron compounds from the arsenic acid solution. If the latter is contaminated with iron on precipitation with for example milk of lime a brownish colored product may be obtained which is not considered desirable in the trade. The demand is for a very white or light colored product as it is considered that this appearance is indicative of purity. Consequently in order to produce a marketable product according to present trade conditions it is necessary to eliminate iron from the material and as much white arsenic contains iron compounds (and this is especially true of arsenical ores) a method for the direct conversion of arsenic acid into calcium arsenate to meet commercial requirements calls for the removal of the iron. According to one form of the present process and involving a preferred embodiment in the case of iron-containing arsenical raw material the iron is removed from the arsenic acid solution by a process of precipitation. In the present case precipitation is preferably brought about by treatment of the solution with sodium acetate, acetic acid, etc., so as to form the basic acetate of iron. The treatment with chlorine has oxidized the iron to the ferric state and this impurity is presumably in the form of ferric chloride. On heating the solution to the boiling point and adding a small amount of sodium acetate the basic acetate of iron precipitates in a form which is readily removed by filtration. If precipitated at a lower temperature the precipitate is not as readily filtered. The filtrate is tested by boiling a sample thereof with an additional quantity of sodium acetate and if further precipitation occurs the batch is treated with more acetate of soda until it is found that the iron is removed. The arsenic acid solution may then be treated with milk of lime to produce the arsenate of lime of very light colored appearance. Other salts such as acetate of lime or other organic acid salts may similarly be used to form the basic compounds of iron which may be removed by filtration, or other precipitating agents may likewise be employed for removing the iron from this arsenical solution.

The foregoing procedure for the removal of iron makes unnecessary the conversion of all the arsenic acid into sodium arsenate in order to form an alkaline solution in which the iron will precipitate and thus avoids the expense of the considerable amount of caustic soda or sodium carbonate required to bring about this neutralization. Hence there is a substantial saving in the cost of manufacture by this step in the procedure of the preferred form of the present invention.

A further modification of the invention is that of forming a solution of arsenic acid by the foregoing means, one which is preferably free from iron compounds and concentrating somewhat if necessary in order to remove excess of water then reacting upon the concentrated arsenic acid solution with pulverized quicklime to form calcium arsenic directly. The quicklime is slaked, as it were, with the water contained in the arsenic acid and heat is developed which accelerates the reaction between the hydrated lime formed and the arsenic acid, permitting a quite thorough union of the reacting materials. By proportioning the amount of water a bulky dry powder may be obtained directly. Such a voluminous powder is perferably prepared using an excess of quicklime so that the product consists of calcium arsenate with a slight excess of hydrated lime. The latter serves to reduce or prevent the formation of water soluble arsenicals sufficient to affect foliage. The proportion of water present in the arsenic acid solution will vary somewhat arcording to the purity of the quicklime employed. Preferably the latter is what is known as a high calcium lime and contains a minimum amount of magnesia and impurities such as silica. This modification of the invention is claimed in our copending application, Serial No. 523,563, filed December 19, 1921.

The following method may be employed to produce calcium arsenate in accordance with the present invention. It is of course understood that no restriction to such procedure is intended as it is here given solely for illustrative purposes and there are numerous variations from the present procedure which in view of the disclosure herein doubtless will be apparent to those skilled in the art.

One part of a commercial grade of white arsenic is mixed with 7 parts by weight of water. Heat is applied until the water boils and chlorine gas is bubbled through the mixture or suspension. As soon as the water boils the heating is discontinued. The chlorine stream is continued until a sample shows permanently blue with starch and potassium iodide in the presence of sodium bicarbonate.

Sodium acetate is added cautiously until a filtered sample shows no red precipitate upon boiling with the addition of a little more acetate. The mixture is brought to boiling and is filtered at once. If the boiling is prolonged the precipitate is liable to take on a form which is difficult to filter. The filtrate is diluted to 10° Bé. or less and if not already cooled it is desirable to reduce the temperature to 35° C. or lower. Carefully triturated milk of lime is added slowly until there is a slight excess. The mixture is boiled for fifteen minutes, filtered, dried at 110–125° C. and if in the drying the product has become caked or the particles are too coarse the product may be put through a grinder to obtain the necessary degree of fineness.

What we claim is:

1. The process of making an arsenical compound which comprises oxidizing white arsenic with chlorine while hot and subsequently in cold acidulated aqueous solution to form arsenic acid, and reacting on the arsenic acid with hydrated lime to form the tricalcium arsenate.

2. The process of making arsenical compounds which comprises reacting on a boiling aqueous acid solution of white arsenic with chlorine, cooling the solution and further treating with chlorine in order to complete the oxidation of the white arsenic and in reacting on the arsenic acid solution with a base, the normal arsenate of the metal of such base being insoluble.

3. The process of making arsenical compounds which comprises reacting on a boiling aqueous acid solution of white arsenic with chlorine, cooling the solution and further treating with an oxidizing agent in order to complete the oxidation of the white arsenic and in reacting on the arsenic acid solution with a base, the normal arsenate of the metal of such base being insoluble.

4. The process of making arsenical compounds which comprises reacting on a boiling aqueous acid solution of white arsenic with chlorine, cooling the solution and further treating with clorine in order to complete the oxidation of the white arsenic and in reacting on the arsenic acid solution with a basic compound to form an arsenate.

5. The process of making arsenical compounds which comprises reacting on a hot aqueous solution of white arsenic with chlorine, cooling the solution and further treating with chlorine in order to complete the oxidation of the white arsenic and in reacting on the arsenic acid solution with milk of lime to form a precipitate of tricalcium arsenate.

6. The process of making an arsenical insecticide which comprises treating a lower oxide of arsenic with chlorine in a hot aqueous acid solution, and then in a cool aqueous acid solution, at least one of said treatments being effected in the presence of a catalyst.

7. In the process of making an arsenical insecticide the steps which comprise treating a lower oxide of arsenic with chlorine, first in hot and then in cold aqueous acid solution.

8. In the process of making an arsenical insecticide the step which comprises treating white arsenic with chlorine in cool aqueous acid solution substantially all of the said white arsenic being in solution.

9. The process of making an arsenical compound suitable for use as in insecticide for application to vegetation which comprises reacting on a lower oxide of arsenic in aqueous acid solution with chlorine first at a boiling temperature and then at a temperature not exceeding 40° C. whereby complete oxidation to arsenic acid is secured, removing any insoluble residue, and reacting upon the solution with milk of lime in such proportion as to form tricalcium arsenate with a very slight excess of calcium hydrate, precipitation of the calcium compound taking place in the cold whereby a fluffy product substantially free from water-soluble arsenical compounds injurious to foliage is obtained.

10. In the manufacture of an arsenical compound suitable for use as an insecticide for application to vegetation the improvement which comprises reacting on a lower oxide of arsenic in aqueous acid solution with chlorine to secure complete oxidation to arsenic acid, adding a soluble acetate thereto in amount sufficient to precipitate the iron, heating to boiling and filtering promptly.

11. In the process of making arsenicals for use as insecticides the step which comprises oxidizing iron-containing white arsenic in acid solution, precipitating iron therefrom while the solution is still acid and removing the iron precipitate.

12. In the process of making calcium arsenate the step which comprises reacting on a concentrated aqueous solution of arsenic acid, with powdered quicklime in such proportions as to produce a voluminous dry powder of calcium arsenate containing a slight excess of hydrated lime.

13. A product comprising light, bulky arsenate of lime, substantially free from soluble arsenic compounds, and containing a small excess of hydrated lime, and also a small amount of calcium chlorid.

14. As a new product, a light, bulky arsenate of lime, containing in excess of 40% of $As_2O_5$, and containing a small percentage of hydrated lime, and containing a small amount of calcium chlorid, such product containing not over .75% of soluble arsenic computed as $As_2O_5$.

CARLETON ELLIS.
V. T. STEWART.